United States Patent [19]

Foster et al.

[11] Patent Number: 5,190,814
[45] Date of Patent: * Mar. 2, 1993

[54] NON-DUSTING WINDOW ENVELOPE FILM UTILIZING A PARTICULATE ANTI-FLECKING AGENT

[75] Inventors: Stephen I. Foster, Bexley; Jeffrey J. Stimler, Newark; Gail S. Nonnemacher, Reynoldsburg, all of Ohio

[73] Assignee: The Dow Chemical Company, Midland, Mich.

[*] Notice: The portion of the term of this patent subsequent to Apr. 23, 2008 has been disclaimed.

[21] Appl. No.: 597,605

[22] Filed: Oct. 15, 1990

Related U.S. Application Data

[63] Continuation of Ser. No. 422,846, Oct. 17, 1989, Pat. No. 5,009,953, which is a continuation-in-part of Ser. No. 220,296, Jul. 18, 1988, abandoned, which is a continuation-in-part of Ser. No. 393,057, Aug. 10, 1989, abandoned.

[51] Int. Cl.$^5$ .................. B32B 5/16; B24C 51/02
[52] U.S. Cl. .................. 428/327; 428/203; 428/206; 428/421; 428/422; 428/519; 229/71
[58] Field of Search .............. 428/200, 206, 203, 421, 428/422, 327, 519

[56] References Cited

U.S. PATENT DOCUMENTS

| | | | |
|---|---|---|---|
| 1,958,005 | 5/1934 | Klinger | 93/61 |
| 3,512,702 | 5/1970 | Pritchard, Jr. | 229/71 |
| 5,009,953 | 4/1991 | Foster et al. | 428/327 |

Primary Examiner—P. C. Sluby

[57] ABSTRACT

Disclosed are window envelopes and method of making wherein the window envelope film from which window patches are made contains a particulate anti-flecking agent and optionally an acid scavenger.

21 Claims, No Drawings

NON-DUSTING WINDOW ENVELOPE FILM UTILIZING A PARTICULATE ANTI-FLECKING AGENT

Cross-Reference to Related Application

This is a continuation of application Ser. No. 422,846, filed Oct. 17, 1989, now U.S. Pat. No. 5,009,953, which is a continuation-in-part application of U.S. Ser. No. 220,296 filed Jul. 18, 1988, now abandoned, and U.S. Ser. No. 393,057 received in the U.S. Patent & Trademark Office on Aug. 10, 1989, now abandoned, both of which are incorporated herein by reference.

BACKGROUND OF THE INVENTION

This invention relates a method for reducing film dust formation during the process of preparing and patching polystyrene window envelope film. A window envelope is an envelope with one or more openings of any shape, usually rectangular, which allows examination of any information, typically a name and an address, printed on a limited area of matter within. The opening or openings are sealed or closed by a window patch composed of a substantially clear film, usually polystyrene.

Patching is the process in which window envelope film is cut into patches of a desired length and width, gummed around the edges, and applied to the window envelope. Alternatively, the edges of the window opening or openings may be gummed instead of the edges of the window patch. The patching process requires the use of a vacuum drum to ensure proper positioning of the film. Film dust results from abrasion and scratching of the passing film by the surface of the vacuum drum due to the disparity in the speed of the passing film and the angular velocity of the drum. The abrasions and imperfections on the surface of the vacuum drum fleck away particles from the surface of the passing film resulting in film dust.

Film dusting was not a serious problem until recent advances in the operating speed of window envelope film patching units. Older units operated at about 400 envelopes per minute while modern units typically operate at about 800–1000 envelopes per minute. The increased abrasion and scratching of the passing film by the surface of the vacuum drum exacerbated the dusting phenomena to the point of becoming a problem.

The vacuum drum on a typical commercial patcher has a multiplicity of minute vacuum holes and grooves on its surface to effect the adherence thereto and guidance thereon of the passing film or film patches. Vacuum holes are recessed in the grooves, which traverse the surface of the vacuum drum in both the machine and cross-machine directions relative to the passing window envelope film. The film dust accumulates in the vacuum holes and grooves and on the raised surfaces of the drum frustrating the adhering effects of the vacuum. Film dust also accumulates at a lesser rate in the internal areas of the vacuum drum and in the apparatus creating the vacuum. Process downtime is required to clean the vacuum drum and associated vacuum implementation equipment.

Window envelope films are typically composed primarily of extruded polystyrene and, optionally, contain a small proportion of a rubber-modified polymer to add a cosmetically desirable haze or measure of translucency to the film with the measure of translucency being proportional to the concentration of the rubber-reinforced polymer. Window envelope film may be manufactured in biaxial or uniaxial orientations. Biaxial orientation is generally preferred because of the superior cuttability of the film in the transverse or cross-machine direction.

U.S. Ser. No. 220,296 filed Jul. 18, 1988, parent application of the present application, is incorporated herein by reference.

SUMMARY OF THE INVENTION

According to the present invention, there is provided a window envelope having one or more window openings, the window opening being entirely closed by a non-opaque plastic window patch, the window patch being formed of a window envelope film having a composition which comprises by weight: polystyrene and a dust-reducing quantity of one or more particulated organic or inorganic compounds. The particulated compound preferably has a melting point greater than the melting point of polystyrene and is further preferably substantially non-compatibilized and chemically inert with and substantially insoluble in the window envelope film. The above particulated compounds are collectively referred to hereinafter as "anti-flecking agents."

Further disclosed is a process for preparing window envelopes, the improvement comprising forming the windows of such envelopes from a film incorporating an anti-flecking agent.

DETAILED DESCRIPTION

The present invention discloses a method of substantially reducing or practically eliminating film dusting in polystyrene-based window envelope films. The beneficial effect of adding particles to the envelope film is not completely understood but is believed to be due to several factors. These factors include raised film surface area and dry lubrication. Dispersion of particles in the film, and thus, the surface of the film effectively raises the surface of the film at each particle point and the localized area around each particle point. The extent of surface raising and the area affected will be proportional to the dimension of the protruding particle portion perpendicular to the tangential plane at the particle point contact area on the vacuum drum surface. The greater the dimension of the protruding particle, the greater the area of raised surface around the particle. The reduction in film surface area in contact with the abraded and imperfect surface of the vacuum roll at any given time results in a significant reduction in film dust formation.

The particle surfaces contacting the vacuum drum surface may act as a dry lubricant if the intrinsic coefficient of friction of the particle material is less than that of the window envelope film itself. The partial substitution of film surface by lubricant particle surface lowers friction between the drum surface and the passing film. Further, some of the particles may fleck from the surface of the film and act as ball bearings between the film surface and the drum surface. Accordingly, in a preferred embodiment, the anti-flecking agents utilized in the present invention possess a coefficient of friction less than that of the envelope film and any other particulate substance which might be present at the surface of the film such as a compatibilized rubber particulate hazing agent.

A non-dusting window envelope film is, for the purpose of the present invention, defined as a polystyrene window envelope film with an amount of an anti-flecking agent added sufficient to reduce film dust formation on the surface of the vacuum drum of the patching unit of the type specified in the Comparitive Example to an extent that there is no trace visible to the unaided eye after a 4000 feet (1219 meters) run of such film when conducted at substantially the same processing conditions as in the Comparitive Example. Subsequent references to a dust-reducing quantity of an anti-flecking agent mean an amount or concentration of an anti-flecking agent in the window envelope film sufficient to effectuate the desired dust-reducing characteristic of above said non-dusting window envelope film.

The anti-flecking agent is desirably substantially non-compatibilized, chemically-inert, and insoluble in the polystyrene window envelope film. Being non-compatibilized refers to a substantial lack of chemical (e.g. polymeric) linking or bonding with the polystyrene component and preferably such a lack with respect to any other substance in the film. Being chemically inert refers to a substantial inability to react with the polystyrene component, or, preferably, also the hazing agent if any or any other component which might be present in the window envelope film. Being insoluble refers to a substantial inability to dissolve in the polystyrene component to an extent such that the physical integrity of the individual particles is substantially maintained.

The composition of a non-dusting window envelope film preferably comprises from about 90 to 99.9 percent polystyrene, from about 0.1 to about 3 percent total by weight of one or more anti-flecking agents, and, optionally, an amount of a hazing agent sufficient to haze the film and an amount of an acid scavenger sufficient to substantially reduce the evolution of certain gaseous decomposition products if the anti-flecking agent is a fluoropolymer.

The preferred particle size range for the anti-flecking agent is from about 0.1 to about 10.0 micron number average particle size. The most effective particle size is generally about 1/100th to about 1/4th of the film thickness. Larger sized particles generally result in too rough a film surface and adversely affect film strength and other properties. Smaller sized particles are generally less effective in reducing dust formation.

Suitable inorganic anti-flecking agents include particulated graphite, mica, chalk, calcium sulfate, calcium silicate, talcum, etc. Examples of suitable organic polymeric anti-flecking agents include particulated polyester, polytetrafluoroethylene (PTFE), and nylon. Preferred particulate anti-flecking agents are non-compatibilized and non-rubberized. Rubberized particles are not as effective in substantially reducing or eliminating dusting as are non-rubberized particles. Most preferred anti-flecking agents are dry lubricants such as talcum powder and particulated PTFE which have a coefficient of friction less than that of the surface of the remainder of the window envelope film and preferably the hazing agent if it is in particulate form.

The hazing agent is a substance, usually a rubber compound, added to the polystyrene to reduce film gloss and add a measure of haze or translucency or contact clarity to the film. Contact haze is desirable in window envelope film because the information shown in the window envelope is more easily read with than without the haze, and any information outside the window opening is made more difficult to read. Examples of suitable hazing agents include rubbery homopolymers of conjugated dienes, especially butadiene, and random, block, or grafted copolymers thereof with up to about 40 percent of a comonomer such as styrene, EPDM rubbers, acrylate rubbers, chlorinated polyethylene, etc. The rubbery compound may be in the form of random or block copolymers. The rubbery compound is preferably present in the film in the form of rubber particles compatabilized with the polystyrene component by copolymerization. Desirably, the rubber particles incorporated should be of sufficient size to result in haze formation. Preferred are rubber particles of from about 0.5 to about 8.0 microns number average particle size and most preferably from about 1.0 to about 3.0 microns.

A most preferred rubber compound is the rubbery component of high-impact polystyrene (HIPS), especially such compositions of polybutadiene and polystyrene prepared by mass or solution polymerization containing from about 5–10 percent by weight rubber. The compatibilized polybutadiene or rubber particles are interspersed in the greater polystyrene matrix of the high-impact polystyrene. A preferred film forming composition contains from about 0.1 to about 1.0 percent rubber by weight as a hazing agent. A most preferred film forming composition contains from about 0.5 to about 0.7 percent rubber by weight as a hazing agent.

The compatibilized rubber particles do not perform satisfactorily as antiflecking agents in substantially reducing or eliminating film dust formation. While the presence of such compatibilized rubber particles may result in a partial reduction of film dusting, such particles cannot be added to the film in a concentration sufficient to substantially reduce or eliminate such dusting without resulting in an unacceptably high level of contact haze. Likewise, the diameter of the compatibilized rubber particles may be increased to reduce dusting, but the particle size limitations previously discussed allow for only partial reduction in dusting. Finally, the compatibilized rubber particles have a higher coefficient of friction than lubricious anti-flecking agents such as talcum and polytetrafluoroethylene.

For window envelope films utilizing a fluoropolymer anti-flecking agent such as polytetrafluoroethylene, the film preferably includes an acid scavenger. Upon heating of the resinous film-forming composition containing the fluoropolymer to elevated temperatures to facilitate processing thereof, acidic decomposition by-products such as hydrogen fluoride, a gas, may form. If allowed to accumulate in the film-forming resin during processing therefor, the gas, which is corrosive and toxic at certain temperatures and concentrations, will evolve and create a safety and health hazard in addition to resulting in bubbles in the finished film product. The acid scavenger reacts with the acidic decomposition by-product to form a compound that is chemically inert with and non-gaseous in the remainder of the resinous film-forming composition at elevated process temperatures. It is understood that an acid scavenger may also be utilized in conjunction with a non-fluoropolymer anti-flecking agent which partially decomposes into acidic by-products during the processing and extrusion of a film-forming composition containing such anti-flecking agent.

The acid scavenger is incorporated into the resinous film-forming composition before extrusion preferably in an amount sufficient to substantially reduce the extent of hydrogen fluoride evolution from the level of evolution that would occur without the inclusion of the scavenger. A substantial reduction corresponds to a reduction of about 90 weight percent or more evolution of hydrogen fluoride. Preferably, the acid scavenger comprises at least 0.005 times the weight of fluoropolymer present in the film. Most preferably, the scavenger comprises from about 0.01 to about 0.1 times the weight of fluoropolymer present in the film.

Suitable acid scavengers include any substances that form a substantially stable and non-gaseous fluoride compound upon reaction with hydrogen fluoride decomposition product. Preferred scavengers include oxides, hydroxides, and organic esters of alkaline earth salts such as zinc oxide, calcium hydroxide, and calcium stearate. Additional scavengers include substances with basic moieties such as inorganic carbonates and hydrotalcite compounds. Preferably, the scavenger will melt into the resinous film-forming composition so as to be nonvisible in the subsequently extruded film. A particularly preferred scavenger is calcium stearate.

The following examples are further illustrative of the present invention, and are not to be construed as limiting. Unless otherwise indicated, all parts and percentages are based upon weight.

EXAMPLES

Test films in Examples 1, 2, and 3 were manufactured in a blown tubular extrusion process though manufacture by other processes such as cast film tentering extrusion is both feasible and practical. The film constituents, polystyrene, high-impact polystyrene, and, in the case of the non-control films, the anti-flecking agent, were extruded at a temperature between 400°-500° F. (204°-269° C.). The most preferred blending temperature is 460° F. (238° C.). The operating temperature at the extrusion die is between 300°-450° F. (149°-232° C.) with the preferred temperature being 420° F. (216° C.).

In Example 4, resinous compositions of polystyrene and fluoropolymer anti-flecking agent with and without an acid scavenger were prepared to determine the effectiveness of the acid scavenger in reducing and eliminating evolution of hydrogen fluoride.

EXAMPLE 1

The control run determined the extent of dust formation on the vacuum drum for a comparative polystyrene window envelope film containing polystyrene of about 300,000 molecular weight and 10 percent HIPS by weight of 3 micron number average particle size as a hazing agent. The HIPS component in both the control film and the treated films comprised 7.0 percent by weight polybutadiene particles and 93 percent by weight polystyrene, corresponding to about 0.7 percent by weight polybutadiene particles in the entire film. The control film did not contain an anti-flecking agent.

Five runs of control film of 30 microns gauge, 4.5 in. (11.43 cm) width, 3.14 in. (7.98 cm) patch length, and 4000 feet (1219 meters) in length were processed on the HSP Patcher for the F. L. Smithe RA 800 Series Envelope Machine. The HSP Patcher has 1/16 in. (0.16 cm) diameter vacuum holes recessed in grooves in both the machine and non-machine directions along the vacuum drum surface. The vacuum drum operated at 800 RPM and 7 in. Hg (23.7 kilopascals) vacuum. After each run, ethylacetate was used to remove the film dust from the surface of the vacuum drum. The solvent was then evaporated and the residue weighed. The average weight of flecked film deposited on the surface of the drum was 5.4 mg. While this amount may seem small, this was only about thirty-three minutes production. Active commercial patching units must be cleaned as often as each week.

Although film dust accumulates in other areas such as the internal areas of the vacuum drum and the surface of the passing film, the important measure of dusting is the amount of dust deposited on the surface of the vacuum drum since the rate of deposition there is much greater than the other areas.

The results of the control runs indicate the unsuitability of the HIPS particle as an antiflecking agent at concentrations not resulting in an unacceptably high level of hazing. Increasing the size of the HIPS particle will lower dusting but not to acceptable levels.

For purposes of comparison, the extent of dusting by the films treated with the anti-flecking agents was estimated relative to that of the control films with only the polystyrene and the hazing agent. The surface of the vacuum drum was visually inspected after each test run of the treated films. Visual inspection of the surface of the vacuum drum after a short run is an acceptable means of identifying and estimating the extent of dusting since trace amounts are easily observable. Dusting of the order of 5.4 mg. as in the control tests was readily visible to the unaided eye.

EXAMPLES 2 AND 3

Window envelope films containing, respectively, talcum and polytetrafluoroethylene (PTFE) powders were processed on the same HSP patcher at substantially the same conditions and film dimension specifications as the control film.

Two 4000 feet (1219 meters) runs of a window envelope film comprising 1 percent by weight talcum powder of a 2 micron number average particle size, 10 percent by weight HIPS as a hazing agent as above, and the remainder polystyrene as above were conducted. Visual examination of the vacuum drum surface revealed an almost complete lack of film dust. In fact, the film containing talcum powder had the effect of polishing the drum.

Two 4000 feet (1219 meters) runs of a window envelope film comprising 0.5 percent by weight Plastomer DC-3 (marketed by Garlock Inc.) PTFE powder of a 2 micron number average particle size, 10 percent by weight HIPS as a hazing agent as above, and the remainder polystyrene as above were conducted. The PTFE powder was incorporated into the film forming composition by addition of polystyrene pellets having 20 weight percent concentration PTFE. Visual examination of the surface of the vacuum drum revealed an almost complete lack of film dust as it had with the film with the talcum powder particles. A run of 48,000 feet (13,716 meters) of the same film likewise showed no trace of dusting on the surface of the vacuum drum.

EXAMPLE 4

The effect of the addition of an acid scavenger to a resinous composition suitable for extrusion into a window envelope film and containing a fluoropolymer anti-flecking agent susceptible to formation of hydrogen fluoride gas was determined. The fluoropolymer anti-flecking agent, PTFE, was present in the composition at far greater than preferred proportion to enhance the amount of hydrogen fluoride formed allowing more definitive analysis of the effect of the acid scavenger.

A resinous composition was formed by mixing at 500 degrees F. 20 percent by weight Plastomer DC-3 (marketed by Garlock Inc.) PTFE powder of a 2 micron number average particle size and the balance General Purpose Polystyrene 6069.02 (marketed by the Dow Chemical Company). About 10 pounds of the composition was collected in a polyethylene container of about 60 liters in volume, and allowed to equilibrate in the vapor space of the container for 5 minutes. The vapor was analyzed for hydrogen fluoride with a Sensidyne model 800 pump having a Gastech 20 ppm HF sensing tube (Catalog No. 17), and found to contain approximately 100 ppm hydrogen fluoride.

A second resinous composition was formed by adding 0.25 weight percent calcium stearate to the above composition. Analysis by the same instrument under substantially the same test conditions failed to detect any hydrogen fluoride.

What is claimed is:

1. A window envelope having a non-opaque plastic window patch formed of a film comprising polystyrene and a quantity of one or more particulate anti-flecking agents protruding from the surface of the film sufficient to make the film non-dusting, the one or more particulate anti-flecking agents each having a melting point greater than the polystyrene of the film and being substantially non-compatibilized and chemically inert with and substantially insoluble in the polystyrene of the film.

2. The window envelope as recited in claim 1, wherein each of the one or more particulate anti-flecking agents is non-rubberized.

3. The window envelope was recited in claim 1, wherein the one or more particulate anti-flecking agents include a particulated fluoropolymer.

4. The window envelope as recited in claim 3, wherein the particulated fluoropolymer is particulated polytetrafluoroethylene.

5. The window envelope as recited in claim 3, wherein an acid scavenger is incorporated into the film.

6. The window envelope as recited in claim 5, wherein the acid scavenger is calcium stearate.

7. The window envelope as recited in claim 1, wherein an amount of a hazing agent sufficient to provide a hazing effect is incorporated into the film.

8. The window envelope as recited in claim 1, wherein the one or more particulate anti-flecking agents include calcium silicate.

9. The window envelope as recited in claim 1, wherein the window patch is sufficiently clear for information to be read through the window patch.

10. The window envelope as recited in claim 1, wherein the film is primarily polystyrene.

11. The window envelope as recited in claim 1, wherein the film is from about 90 to about 99.9 percent by weight of polystyrene.

12. A substantially clear film which comprises polystyrene and a quantity of one or more particulate anti-flecking agents protruding from a surface of the film sufficient to make the film non-dusting, the one or more particulate anti-flecking agents each having a melting point greater than the polystyrene and being substantially non-compatibilized and chemically inert with and substantially insoluble in the polystyrene of the film.

13. The film as recited in claim 12, wherein each of the one or more particulate anti-flecking agents is non-rubberized.

14. The film as recited in claim 12, wherein an amount of a hazing agent sufficient to provide a hazing effect is incorporated into the film.

15. The film as recited in claim 12, wherein the one or more particulate anti-flecking agents include a particulated fluoropolymer.

16. The film as recited in claim 15, wherein the particulated fluoropolymer is particulated polytetrafluoroethylene.

17. The film as recited in claim 15, wherein an acid scavenger is incorporated into the film.

18. The film as recited in claim 17, wherein the acid scavenger is calcium stearate.

19. The film as recited in claim 12, wherein the film is primarily polystyrene.

20. The film as recited in claim 19, wherein the film is from about 90 to about 99.9 percent by weight of polystyrene.

21. The film as recited in claim 12, wherein the one or more particulate anti-flecking agents include calcium silicate.

* * * * *